US006463648B2

(12) United States Patent
Göttling et al.

(10) Patent No.: US 6,463,648 B2
(45) Date of Patent: Oct. 15, 2002

(54) METHOD FOR THE INSTALLATION AND REMOVAL OF A CYLINDER OF A PRINTING MACHINE AND DEVICE FOR THIS PURPOSE

(75) Inventors: Josef Göttling, Friedberg; Godber Petersen, Augsburg, both of (DE)

(73) Assignee: MAY Roland Druckmaschinen AG, Offenbach am Main (DE)

( * ) Notice: Subject to any disclaimer, the term of this patent is extended or adjusted under 35 U.S.C. 154(b) by 28 days.

(21) Appl. No.: 09/792,328

(22) Filed: Feb. 23, 2001

(65) Prior Publication Data

US 2001/0054359 A1 Dec. 27, 2001

(30) Foreign Application Priority Data

Feb. 23, 2000 (DE) ........................................ 100 08 224

(51) Int. Cl.[7] ................................................ B23P 19/00
(52) U.S. Cl. .................... 29/426.1; 29/402.08; 101/216
(58) Field of Search ................................ 101/216, 483, 101/153, 477; 29/426.1, 426.5, 895.1, 402.08, 464; 72/239

(56) References Cited

U.S. PATENT DOCUMENTS 3,541,665 A * 11/1970 Ferris ........................ 29/895.1
5,289,769 A 3/1994 Lewis
5,638,754 A * 6/1997 Steinmeier
5,787,808 A 8/1998 Stram et al.
6,142,073 A * 11/2000 Zeman

FOREIGN PATENT DOCUMENTS

| | | | |
|---|---|---|---|
| DE | 44 13 692 | C1 | 8/1995 |
| DE | 296 14 761 | U1 | 12/1996 |
| DE | 197 31 844 | A1 | 4/1998 |
| DE | 298 22 104 | U1 | 4/1999 |

* cited by examiner

*Primary Examiner*—S. Thomas Hughes
*Assistant Examiner*—Steven Blount
(74) *Attorney, Agent, or Firm*—Cohen, Pontani, Lieberman & Pavane

(57) ABSTRACT

In the installation and removal of a cylinder of a printing machine, in which the cylinder has a middle drum and two lateral bearing, stubs which are capable of being secured releasably to the drum and of being connected to one another by means of a central spindle which passes through the drum and which at least at one end, can be screwed, by means of a screw connection provided within the outer circumference of the spindle, to the adjacent bearing stub which, with the screw connection released, can be removed, together with its bearing housing, at least to all extent such that the drum is accessible from the side, a high degree of safety and a time saving can be achieved in that, for the change, the drum of a cylinder is released from the bearing stubs and one bearing stub is removed, after which the consequently exposed end of the spindle of the cylinder has connected to it, in the same way as the removable bearing stub, a spindle extension, onto which the drum is pushed and which is then released from the spindle and moved away together with the drum, and vice versa.

20 Claims, 5 Drawing Sheets

16
15
13
5
10
14
1
9
11
12
24
8
2
24
3
1
7
6
4

METHOD FOR THE INSTALLATION AND REMOVAL OF A CYLINDER OF A PRINTING MACHINE AND DEVICE FOR THIS PURPOSE

BACKGROUND OF THE INVENTION

1. Field of the Invention

The invention relates to a method for the installation and removal of a cylinder of a printing machine and to a device, suitable for this purpose, for receiving a cylinder of a printing machine.

2. Description of the Related Art

A printing machine, in which the cylinder has a middle drum and two lateral bearing stubs which are capable of being secured releasably to the drum and of being connected to one another by means of a central spindle which passes through the drum and which, at least at one end, can be screwed, by means of a screw connection provided within the outer circumference of the spindle, to the adjacent bearing stub which, with the screw connection released, can be removed, together with its bearing housing, at least to an extent such that the drum is accessible from the side, is in the applicant's possession. However, a suitable device for the installation and removal of the cylinders is not available. Hitherto, the procedure. in this case, has been to change the cylinder from above. In view of this, all the subassemblies arranged above a cylinder which is affected in each case have to be removed, so that a suitable lifting appliance can be inserted from above.

SUMMARY OF THE INVENTION

Proceeding from this, the object of the present invention is, therefore, to make it easier to install and remove a cylinder in a printing machine of the above-mentioned type. In accordance with the invention, the method for the installation and removal of a cylinder from a printing machine provides that the drum of a cylinder is released from the associated bearing stubs and one bearing stub is removed., after which the consequently exposed end of the spindle of this cylinder has connected to it, in the same way as the removable bearing stub, a spindle extension, onto which the drum is pushed, the spindle extension then being released from the spindle and moved away, together with the drum, and vice versa.

The device for installation and removal of a cylinder of a printing machine includes a spindle extension which when the bearing stub is removed, can be connected to the end of the spindle of a cylinder and which extension is provided with a screw-connection element corresponding to the screw-connection element of the removable bearing stub, the spindle extension having the same outside diameter as the spindle and projecting from a holder which is received on a carrier and can be manipulated on all sides.

The measures according to the invention advantageously make it possible to carry out a lateral cylinder installation and removal, utilizing the possibilities of the basic printing machine in a specific way, with the result that the disadvantages specified above are avoided completely. The result of using a multi-part cylinder with a middle drum releasable from the lateral bearing stubs and of the removability of at least one bearing housing, together with the bearing stub. is that, by a bearing housing, together with the bearing stub, being removed, a large orifice in the machine side wall is formed, via which the drum can be removed and installed. Access from above is advantageously unnecessary in this case, so that even all the subassemblies, including an upper machine cover, which are located above the cylinder affected call remain in position. The spindle extension capable of being coupled to the cylinder-side spindle ensures that the cylinder drum affected is guided reliably when it is passing though the orifice in a machine side wall produced by the removal of a bearing housing, so that collisions with the machine side wall and therefore damage are ruled out. At the same time, the spindle extension also makes it possible to absorb the weight of the drum reliably, so that the latter can simply be displaced by hand. A displacer is therefore advantageously not required. The carrier, receiving, the holder of the spindle extension serves advantageously for Involving the spindle extension uncoupled from the spindle. By means of the measures according to the invention, therefore, the above-mentioned object is achieved in the simplest and most cost-effective way possible.

The drum may advantageously be provided with sliding-bearing bushes to facilitate sliding of the drum on the spindle and spindle extension. This makes it easier for the drum to be displaced by hand.

A further expedient measure may be for the spindle and the spindle extension to be provided with a sliding covering formed e.g., by hard-chrome plating. This, too, makes it easier to displace the drum manually.

In a further development of the overriding measures, the spindle extension may have an outer carrying tube and a shaft which passes through the latter and which is capable of being, supported on the carrying tube in the axial direction and has, at its front end, a screw-connection element assigned to the screw-connection element of the spindle and, at its rear end projecting from the holder, an actuating element. These measures ensure that the outer carrying tube receiving the drum does not have to be rotated when it is coupled to and uncoupled from the spindle. A drum received on the carrying, tube therefore cannot impose any resistance to the coupling and uncoupling operation.

At the same time, a measure which is to be preferred may be to provide, at the front end of the spindle extension, a centering member which can be brought into engagement with an associated centering member of the spindle. This ensures that a continuous joint is maintained between the spindle and the spindle extension, thus making it easier for the drum to be transferred from one element onto the other.

Advantageously, the holder receiving the spindle extension may be provided with a blocking means assigned to the drum and expediently designed as a fall hook capable of being, brought into engagement into a drum-side groove. This ensures that the drum received on the spindle extension is secured reliably, which effectively prevents accidents when the entire drum-receiving device is moved by means of a suitable carrier, for example a lifting appliance.

In a further development of the overriding measures, the holder may be provided with connection means for a lifting appliance, in which case a plurality of connection means provided, for example, above the centre of gravity are expediently provided, said connection mean being offset laterally relative to one another. The connection means for a lifting appliance makes it possible to use an indoor crane, usually present, for moving the entire drum-receiving device. The connection means for a lifting appliance, which are offset laterally relative to one another, make it possible to carry out a selection, so that force can be applied exactly above the centre of gravity, thus increasing the degree of safety.

A further expedient measure may be for the holder to be provided with trip elements projecting obliquely downwards. This makes it easier to manipulate the holder suspended on a lifting appliance. In the state of rest, the grip elements projecting downwards may advantageously also function as set-down feet.

Further advantageous refinements and expedient developments of the overriding measures are specified in the remaining sub-claims and may be gathered in more detail from the following description of examples with reference to the drawing.

The various features of novelty which characterize the invention are pointed out with particularity in the claims annexed to and forming a part of the disclosure. For a better understanding of the invention, its operating advantages, and specific objects attained by its use, J reference should he had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
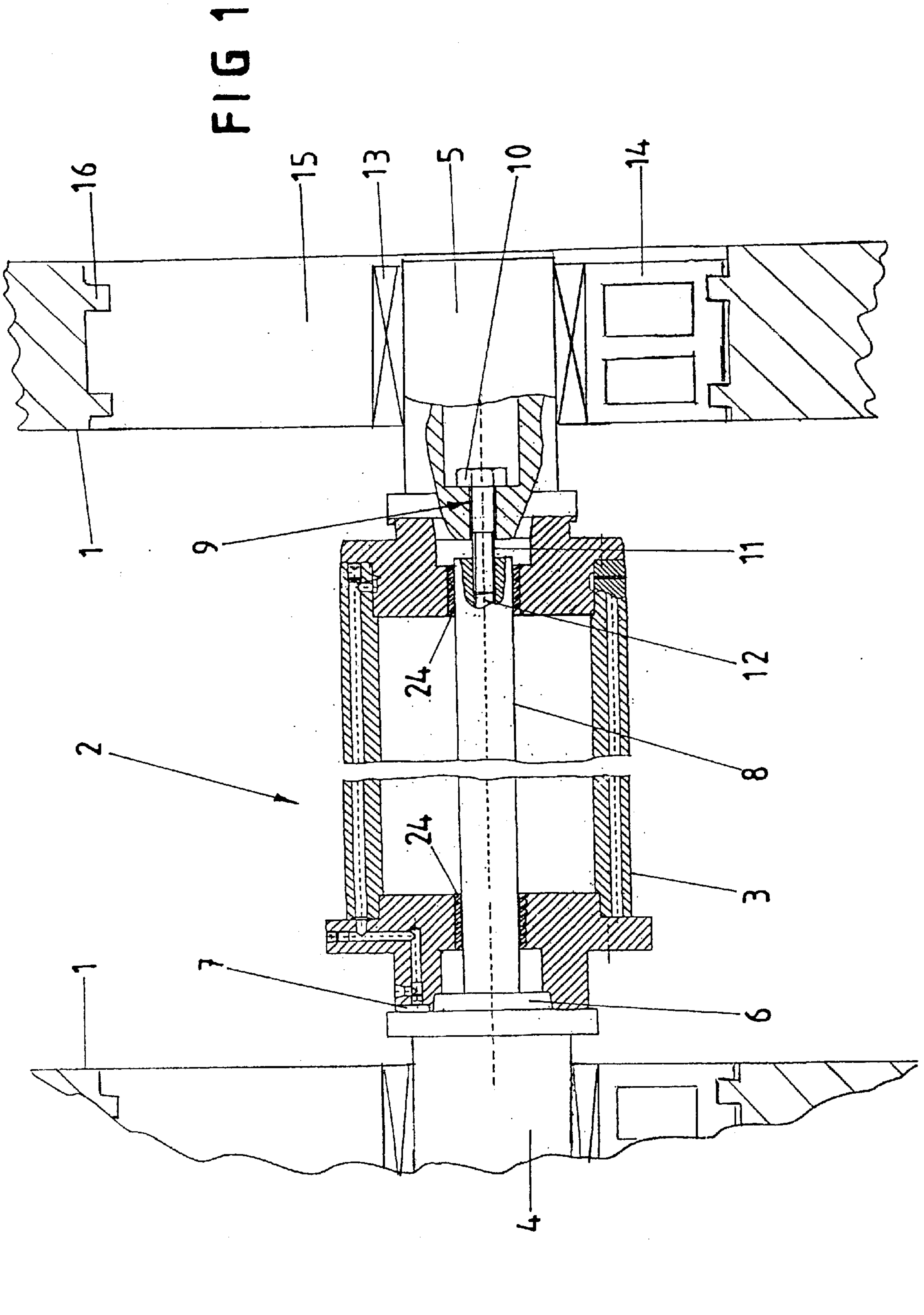
FIG. 1 is a partial view of a printing machine with installed cylinders depicted in section.

The printing machine, on which FIG. 1 is based and of which only palls of the two side walls and one cylinder 2 are illustrated, contains multi-part cylinders. These each consist of a middle drum 3 and of two lateral bearing stubs 4, 5 receiving the drum 3 releasably between them. During operation, a sleeve, not illustrated in any more detail here, can be received on the drum 3 and is designed as a formed sleeve or transfer sleeve, depending on the type of cylinder. The bearing stubs 4, 5 each possess a cone journal 6 which is assigned a conical scat on the drum side. One of the bearing stubs 4, 5 is connected to a drive device. To transmit the torque to the drum 3, the latter call be screwed to the drive-side bearing stub. In the example illustrated, the drive-side bearing stub 4 is provided with one or more axially projecting drivers 7 which engage in the manner of a toothing into associated drum-side driver recesses.

The two bearing stubs 4, 5 are connected to one another by means of a central spindle 8 passing through the drum 3. The length of the spindle 8 projecting from the drive-side bearing stub 4 is dimensioned Such that its end remote from the drive is spaced from the adjacent bearing stub 5. The spacing is bridged by a screw 9 which functions as a tie and which is supported with its head 10 on the associated bearing stub 5 and engages, with a threaded shank 11 projecting from the latter, into an associated threaded bore 12 of the spindle 8. In the example illustrated, that bore of the bearing stub 5 which is assigned to the screw is designed as a stepped bore. The screw head 10 can be supported on the shoulder thus formed, which contributes to shortening the screw 9. By the screw 9 being tightened, the bearing stubs 4, 5 are thrown onto the drum 3, the mutually associated bearing faces coming to bear on one another and the driver members coming into engagement with one another. By the screw 9 being released, the connection between the bearing stubs 4, 5 and the middle drum 3 is broken.

The bearing stubs 4, 5 are supported on the side walls 1 via bearing housings 14 containing the associated bearings 13. These side walls are provided, in the example illustrated, with window-like recesses 15 assigned to the cylinders 2. In the region of the inner surface of the recesses 15, guide rails 16 are provided, on which the bearing housings 14 are received displaceably. The window-shaped recesses 15 are, in this case, so large that. with the bearing stub 5 released from the drum 3, the bearing housing 14 assigned to the bearing stub 5 remote from the drive can be displaced, together with said bearing stub, to an extent Such that the drum 3 is accessible from the side located opposite the drive side. The access formed hi this way to the drum 3 is indicated at 15*a* in FIGS. 2 and 3. Instead of the slide-like design of the bearing housings 14 which is provided here, it would also be conceivable for the bearing housings 14 to be designed as pivotable flaps which, together with a bearing stub received on them, can be pivoted out of the respectively associated recess of the side wall remote from the drive, to an extent such that the associated drum is likewise accessible from this side.

In the event of a change of format, for example, the drum 3 has to be exchanged. 4 For this purpose, the screw 9 is released and is disengaged from the spindle 8, with the result that the connection to the spindle 8 is broken. The bearing stub 5 remote from the drive is subsequently disengage from the drum 3. The bearing housing 14 assigned to the bearing stub 5 remote from the drive can thereafter be displaced, together with the bearing stub 5, to an extent Such that the drum 3 is accessible from the side remote from the drive. Said drum initially remains in position and is supported by the spindle 8 projecting from the drive-side bearing stub 4.

Figure 2:
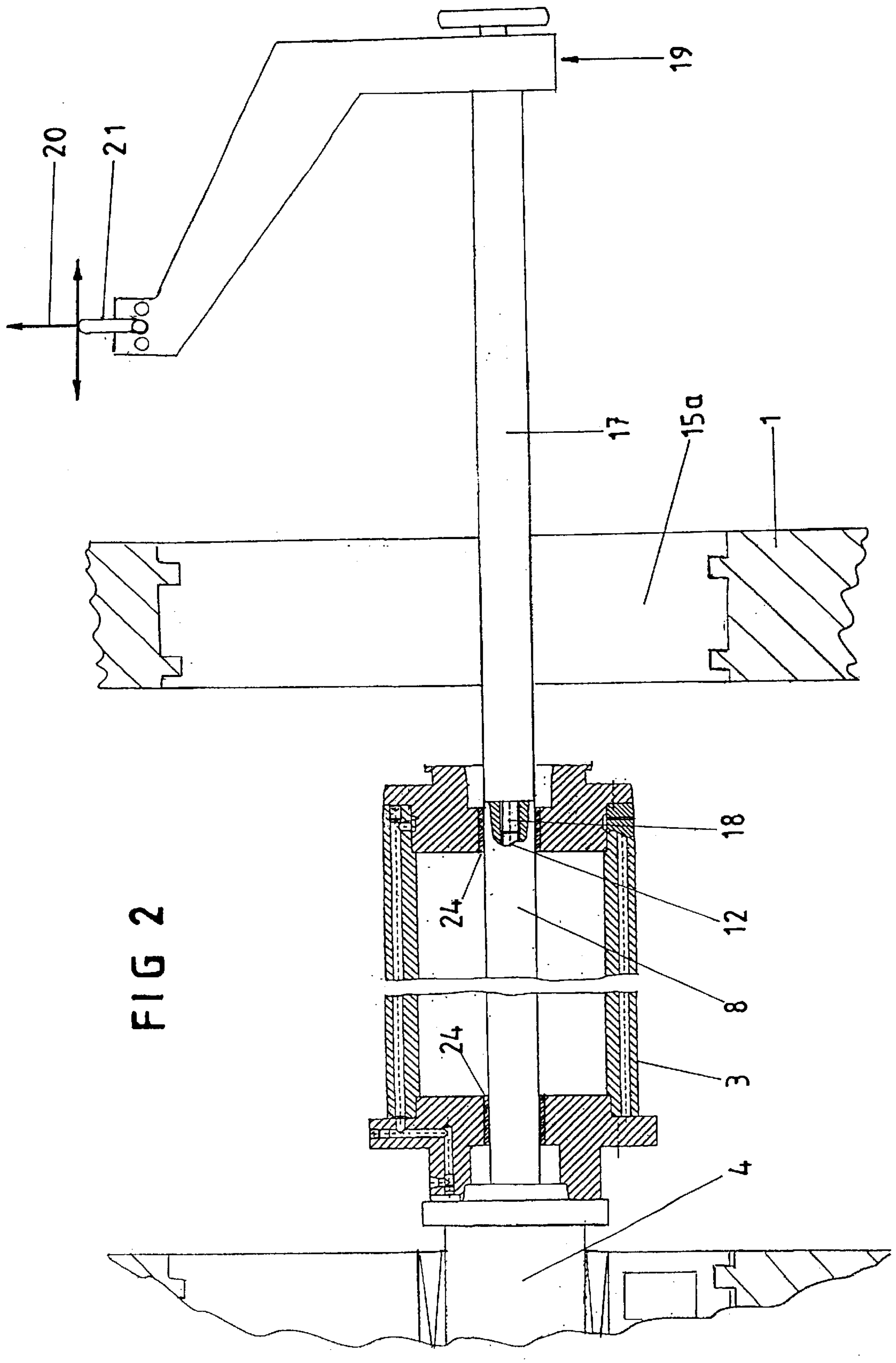
FIG. 2 is a view similar to FIG. 1, with the spindle extension brought into position.

Subsequently, as indicated in FIG. 2, a spindle extension 17 is introduced into the machine from the side remote from the drive via the access 15*a* to the drum 3 provided by the removal of the bearing housing 14 remote from the drive and is coupled to the spindle 8 uncouple(d from the bearing stub 5. The bearing housing 14 remote from the drive, displaced in order to form said access 15*a*, is not illustrated in FIG. 2 for the sake of simplicity.

The spindle extension 17 possesses the same outside diameter as the spindle 8, so that in the coupled state, a continuous joint is obtained. The threaded bore 12 of the spindle 8, said threaded bore being located within the outside diameter of the spindle 8, is utilized for coupling the spindle extension 17 to said spindle. The threads in bore 12 correspondingly matching with threads on the next described threaded pill 18. The spindle extension is accordingly provided with a front threaded pin 18 which can be screwed into the threaded bore 12 and the thread of which corresponds to the thread of the screw 9 provided for coupling the bearing stub 5. Those regions of the mutually confronting end faces of the spindle 8 and spindle extension 17 which are located outside the screw-connection elements in the form of the threaded bore 12 and of the threaded pin 18 rest flush against one another in the coupled position, so that a gapless and continuous extension of the spindle 8 is obtained.

The spindle extension 17 projects from an associated holder 19 which is capable of being moved on all sides in three-dimensional movements by means of an associated carrier 20 merely indicated by movement arrows. It is to be understood that the carrier 20 could be a crane such as an indoor crane in a space containing the printing machine. This may be, for example, a lift truck which is provided with a steering means and on the raisable and lowerable lifting assembly of which the holder 19 can be received. Where there is an indoor crane, it is appropriate to utilize this as a carrier assigned to the holder 19. The example depicted is based on an arrangement of this type. The holder 19 is, in this case, provided with a clevis 21, on which a crane hook can be brought into engagement. The holder 19 is, at the same time, designed as a shackle partially projecting, beyond tile spindle extension 17, thus allowing suspension approximately above the centre of gravity.

Figure 3:
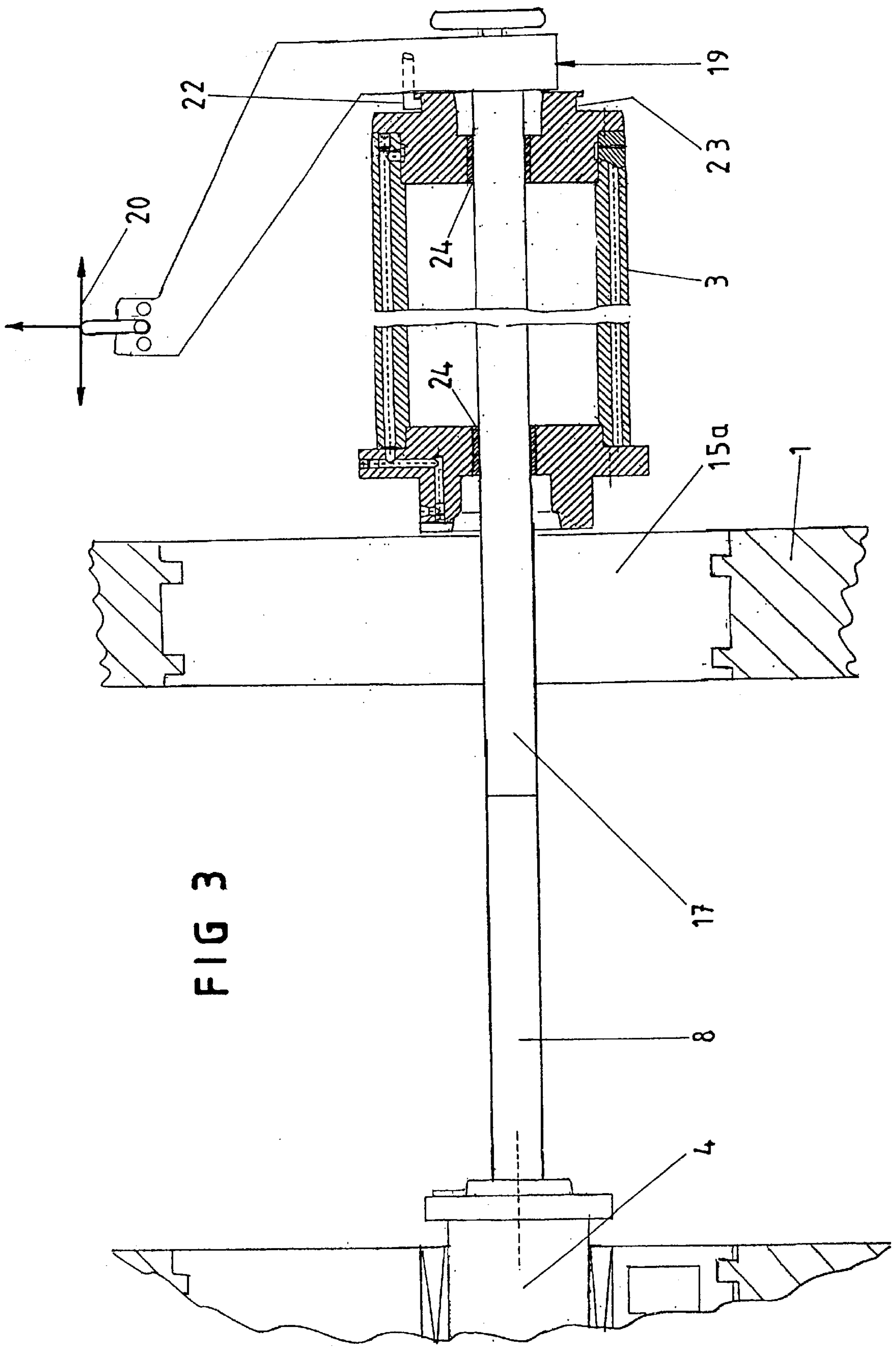
FIG. 3 is a view similar to FIG. 2, with the drum pushed onto the spindle extension.

After the spindle extension 17 is coupled to the spindle 8, the drum 3 is pushed over from the spindle 8 onto the spindle extension 17, as indicated in FIG. 3. In so far as the drum 3 is screwed to the drive-side bearing stub 4, this screw connection must, of course, be released beforehand. In the example illustrated, no such screw connection is provided. There is, instead, merely a rotationally fixed plug connection.

The length of the spindle extension 17 corresponds at least to the length of the spindle 8, so that the drum 3 can be received completely on the spindle extension 17. In the example illustrated, the length of the spindle extension 17 is dimensioned such that portion of the spindle extension 17 coupled to the spindle 8 which projects outwards from the side wall 1 through which the spindle extension 17 passes corresponds at least to the length of the drum 3, as can be seen from FIG. 3 This ensures that the drum 3 can be pushed with its entire length out of the machine via the access 15*a* provided in the side wall 1 by the removal of the bearing housing 14.

The drum 3 is expediently pushed onto the spindle extension 17 simply until it butts against the holder 19 and is located in a mounted transport position. In order to secure tile drum 3 against unintentional displacement in this transport position, a securing means is provided with securement member in the form of a holder-side fall hook 22 which can fall into an associated drum-side recess 23. Expediently, for this purpose, that collar of the drum 3 which is remote from the drive is provided with a peripheral groove.

For transporting the removed drum 3 away from the spindle 8, the coupling between the spindle 8 and spindle extension 17 is released by the threaded pin 18 bin unscrewed from the threaded bore 12. The holder 19 is subsequently moved away by means of the associated carrier 20. hi order to install a drum 3, the work steps described above take place in reverse order.

The drum 3 is moved by hand from the FIG. 2 position into the FIGS. 3 position. In order to ensure as little displacement resistance as possible here, the drum is provided with sliding, bearing bushes 24 assigned to the spindle 8 and to the spindle extension 17 respectively. Said bushes are inserted into the drum-side end walls, by means of the which the drum 3 is supported on the spindle 8 and spindle extension 17. In addition, the spindle 8 and spindle extension 17 may be provided with a circumferential sliding covering, so as to obtain a displacement mounting with very easy movement. For this purpose, the spindle 8 and the spindle extension 17 are expediently hard chromium-plated on their circumferential surface.

Figure 4:
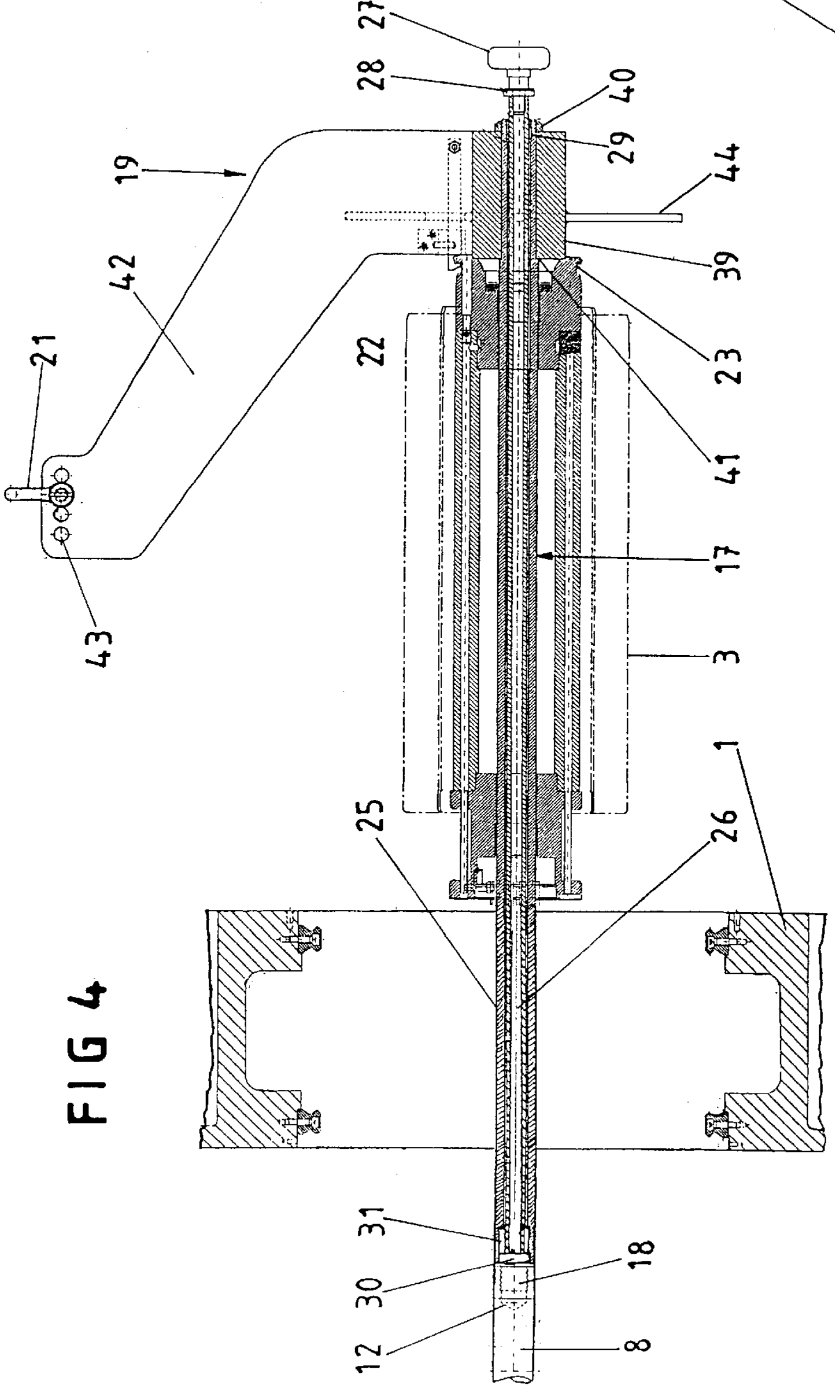
FIG. 4 is a partial view of a preferred embodiment of the drum-receiving device, with the spindle extension shown in section.

For coupling and uncoupling the spindle extension 17, its threaded pin 18 must be rotated. To avoid having at the same time to co-rotate a drum received on the spindle extension 17, the spindle extension 17 is of multi-part design, as illustrated in FIG. 4. In this case, the spindle extension 17 contains an outer carrying tube 25 which is hard-chromium-plated circumferenitially and receives the drum 3, and a shaft 26 which is arranged coaxially in the carrying tube 25 and passes through the latter and which at its front end carries the threaded pin 18 which projects from or is capable of being moved out of the carrying tube 25 and which can be brought into engagement with the spindle-side threaded bore 12 aligned with it. The rearward end, projecting from the holder 19, of the shaft 26 is provided with all actuating element 27 which is designed here as a handwheel and by means of which the shaft 26 can be rotated in order to execute the coupling and uncoupling operation.

The shaft 26 can be supported on the carrying tube 25 in the axial direction. For this purpose, in the example illustrated, a Supporting flange 28 adjacent to the actuating element 27 is provided, which runs up against the rearward end face of the carrying tube 25 and consequently throws the latter flush onto the spindle 8. The shaft 26 is designed for reasons of weight as a hollow shaft which is provided merely at the rear and at the front with the threaded pins 18 or rotary parts containing the actuating element 27 and the supporting flange 28. In order to bring about easy rotatability of the shaft 26, the latter is mounted in the region of its front and rear ends in the carrying tube 25. For this purpose, a bearing bush 29 inserted into the carrying tube 25 is provided in the region of the rear end. At the front, the shaft 26 contains a Shoulder 30 which is arranged in the manner of a piston in an associated stepped widening 31 of the bore of the carrying tube 25 and from which the threaded pin 18 projects.

Figure 5:
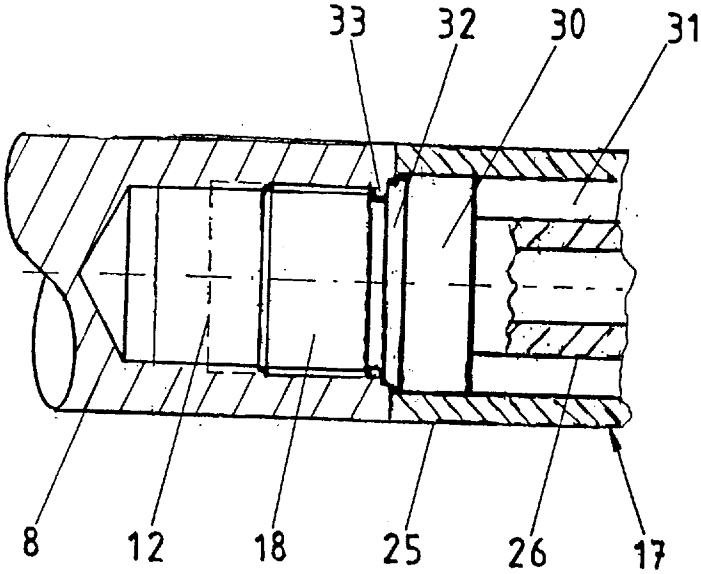
FIG. 5 depicts an example of the screw connection between the spindle and spindle extension.

As can best be seen from FIG. 5, the shoulder 30 may be provided with a conical chamfer 32 which is arranged in the region of its front outer edge and which, in the coupled state, engages into an associated conical seat 33 of the spindle 8. This ensures exact mutual centering of the spindle 8 and spindle extension 17, 50 that the joint is guaranteed to be continuous.

Figure 6:
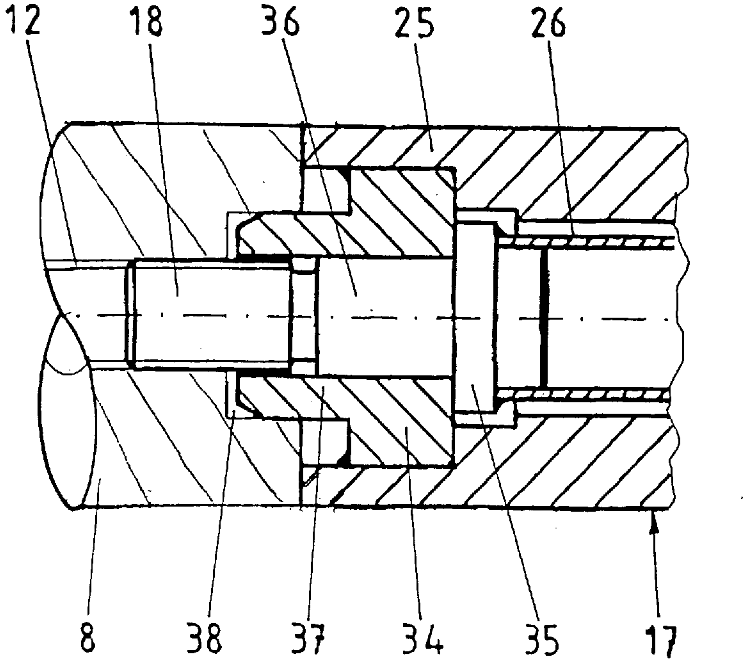
FIG. 6 depicts another example of the screw connection between the spindle and spindle extension.

In the alternative on which FIG. 6 is based, the carrying tube 25 is provided. in the region of its font end, with an inserted bearing part 34, in the bore of which the shaft 26 engages by means of a bearing journal 36 which projects from a supporting flange 35 engaging behind the bearing part 34 and which the threaded pin 18 adjoins. A rearward supporting flange may be dispensed with in this case. The bearing part 34 possesses a forward-projecting collar 37 which is capable of being moved into an associated widening 38 of the threaded bore 12 of the spindle 8. The collar 37 and the associated bore widening 38 possess mutually assigned bearing faces producing a centric sliding fit of easy movement, with the result that, in this version too, exact mutual centering of the spindle 8 and spindle extension 17 is achieved.

As can also be seen from FIG. 4, the holder 19 is provided with a solid bush 39, into which the carrying tube 25 is inserted with its rear end. To form an abutment 41 for the bush 39, the carrying tube 25 is provided rearwards with a lathe-turned portion. The rear end, projecting from the bush 29, of the carrying tube 25 is provided with a thread, on which is received a tension nut 40, by means of which the bush 39 can be pressed against the associated abutment 41, so that a wobble-proof connection is obtained.

Figure 7:
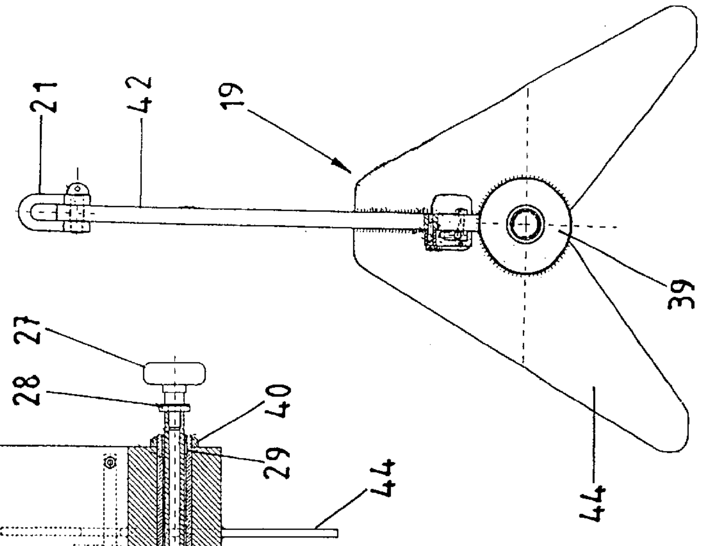
FIG. 7 is an end view of the FIG. 4 arrangement.

As shown in FIGS. 4 and 7, the bush 39 is fastened to the lower end of a carrying arm 42 of the holder 19. The carrying arm 42 is designed as a shackle which projects beyond the bush 39 in the direction of the spindle extension 17 and the upper end of which is located approximately above the centre of gravity of the entire drum receiving device when the spindle extension 17 is loaded with a drum 3. In order to make it possible to have as good a weight distribution as possible and to introduce force as accurately as possible above the centre of gravity of the entire arrangement, the clevis 21 is laterally adjustable. For this purpose, in the examples illustrated, the carrying arm is provided with a plurality of bores 43 arranged laterally next to one another and assigned to the clevis 21. These bores allow the desired fine setting for the introduction of force. For this purpose, the clevis 21 simply has to be shifted from one bore 43 to another.

The holder 19 suspended on a crane rope, etc. can easily be manoeuvred by hand, that is to say can be brought into the desired coupling position. In order to make Such operation easier, the holder 19 is provided with grip elements 44, vane-like here, which project obliquely downwards, as can also be seen from FIGS. 4 and 5. With the holder 19 set down on the ground, the drip elements 44 extending diverging downwards from opposite sides of the holder may also serve as a supporting pedestal.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for installing and removing a printing machine cylinder, said cylinder having a drum, a pair of bearing stubs, bearing housings supporting each of said bearing stubs, a spindle passing centrally through the drum for releasably securing said bearing stubs against each of opposite ends of said drum, the spindle being connected at an end to one of said bearing stubs, an opposite tip end of the spindle located proximal a second of said bearing stubs, and a screw connector extending through said second bearing stub and into a threaded bore in said spindle opposite tip end for connecting said spindle opposite tip end to said second bearing stub, said method comprising the steps of:

removing said screw connector from said spindle opposite tip end;

removing said second bearing stub and the bearing housing supporting said second stub bearing;

threadedly connecting a spindle extension to said opposite tip end of said spindle;

sliding the drum from the spindle onto the spindle extension so it can be mounted on the spindle extension and removed from the printing machine; and reinstalling the drum by practicing the above steps in reverse order.

2. A device for receiving a printing machine cylinder during cylinder installation and removal, the cylinder including a drum, a pair of bearing stubs, bearing housings supporting each of said bearing stubs, a spindle passing centrally through the drum for releasably securing said bearing stubs against each of opposite ends of said drum, the spindle being connected at an end to one of said bearing stubs, an opposite tip end of the spindle located proximal a second of said bearing stubs, and a screw connector extending through said second bearing stub and into a threaded bore in said spindle opposite tip end for connecting said spindle opposite tip end to said second bearing stub, said device comprising:

a spindle extension mounted in the holder and projecting therefrom;

a threaded connection element on said spindle extension, said connection element having threads and an outside diameter in correspondence with the threads and outside diameter of said screw connector;

a holder, said spindle extension being mounted in said holder; and a carrier, said holder being suspendable from said carrier for manipulating said holder in three-dimensional movements so that on removal of said screw connector from said spindle and removal of said second bearing stub from securement against said drum, said spindle extension can be positioned to threadedly connect said spindle extension to said spindle tip end to allow sliding of said drum from said spindle onto said spindle extension.

3. A device according to claim 2, wherein said drum has sliding-bearing bushes for supporting said drum on said spindle and spindle extension during sliding of said drum thereon.

4. A device according to claim 2, wherein said spindle and said spindle extension have a surface covering thereon to facilitate sliding of said drum thereon.

5. A device according to claim 4, wherein the surfaces of said spindle and said spindle extension are hard-chromium plated.

6. A device according to claim 2, wherein said spindle extension comprises:

an outer carrying tube;

a shaft disposed in the carrying tube and supported axially therein, a front end of said shaft carrying said threaded connection element, a rear end of said shaft projecting from said holder; and a shaft actuating element carried on said shaft rear end.

7. A device according to claim 6, wherein said shaft is a hollow tube, said connection element comprising a rotary part with a threaded pin, said threaded pin being threadable into the threaded bore in the opposite tip end of said spindle for connecting said spindle extension to said spindle.

8. A device according to claim 2, comprising cooperating centering members carried on each of the opposite tip end of said spindle and a front end of said spindle extension to facilitate aligning said spindle extension with said spindle when connecting said spindle to said spindle extension.

9. A device according to claim 2, wherein said spindle extension comprises a carrying tube, and a shaft mounted in said carrying tube.

10. A device according to claim 2, wherein said holder includes a carrying arm, a solid bush in said carrying arm, said spindle extension being mounted in said solid bush.

11. A device according to claim 10, wherein said carrying arm extends forwardly in a direction of the spindle extension, said carrying arm having means for connecting the carrying arm to said carrier, said means being disposed above a region of a center of gravity of the holder and projecting spindle extension with a drum received on said spindle extension.

12. A device according to claim 11, wherein said means for connecting comprise a plurality of openings in the holder spaced in line one from another.

13. A device according to claim 10, wherein said holder includes grip elements extending obliquely from opposite sides of said holder.

14. A device according to claim 2, wherein said holder includes a drum securement member to secure said drum against movement on the holder during transport.

15. A device according to claim 14, wherein said drum securement member comprises a fall-hook, said hook being receivable in a recess in the drum.

16. A device according to claim 15, wherein said recess is a peripheral groove in the drum.

17. A device according to claim 2, comprising a clevis carried on the holder for connecting the holder to the carrier.

18. A device according to claim 17, wherein the carrier is a mobile lifting device.

19. A device according to claim 17, wherein said carrier is a crane.

20. A device according to claim 19, wherein the crane is an indoor crane in a space wherein the printing machine is situated.

* * * * *

UNITED STATES PATENT AND TRADEMARK OFFICE

CERTIFICATE OF CORRECTION

PATENT NO. : 6,463,648 B2
DATED : October 15, 2002
INVENTOR(S) : Josef Göttling

It is certified that error appears in the above-identified patent and that said Letters Patent is hereby corrected as shown below:

Title page,
Item [73], should read:

-- [73] Assignee: MAN Roland Druckmaschinen AG
Offenbach am Main (DE) --

Signed and Sealed this

Twenty-second Day of July, 2003

JAMES E. ROGAN
*Director of the United States Patent and Trademark Office*